United States Patent [19]

Sasuta et al.

[11] Patent Number: 4,723,264

[45] Date of Patent: Feb. 2, 1988

[54] SIGNALLING METHOD FOR ESTABLISHING TRUNKED COMMUNICATION

[75] Inventors: Michael D. Sasuta, Palatine; Kenneth J. Zdunek, Schaumburg, both of Ill.

[73] Assignee: Motorola, Inc., Schaumburg, Ill.

[21] Appl. No.: 64,907

[22] Filed: Jun. 19, 1987

[51] Int. Cl.$^4$ .............................................. H04Q 7/01
[52] U.S. Cl. ........................................ 379/58; 379/63; 379/59; 455/33
[58] Field of Search ................ 455/33, 58, 38, 56; 379/58, 63, 57, 60, 59

[56] References Cited

U.S. PATENT DOCUMENTS

| | | | |
|---|---|---|---|
| 3,575,558 | 4/1971 | Leyburn et al. | 379/57 |
| 4,012,597 | 3/1977 | Lynk, Jr. et al. | 179/41 A |
| 4,312,070 | 1/1982 | Coombes et al. | 371/40 |
| 4,352,955 | 10/1982 | Kai et al. | 379/57 |
| 4,517,669 | 5/1985 | Freeburg et al. | 370/82 |
| 4,519,068 | 5/1985 | Krebs et al. | 370/82 |
| 4,553,262 | 11/1985 | Coe | 455/15 |
| 4,577,060 | 3/1986 | Webb et al. | 379/57 |
| 4,612,415 | 9/1986 | Zdunek et al. | 179/2 EB |
| 4,654,777 | 3/1987 | Nakamura | 364/200 |
| 4,658,435 | 4/1987 | Childress et al. | 455/17 |
| 4,679,244 | 7/1987 | Kawasaki et al. | 455/54 |

Primary Examiner—Robert Lev
Attorney, Agent, or Firm—Thomas G. Berry

[57] ABSTRACT

A trunked communication signalling method is provided by a unifying signalling protocol in which subscribers request communication channels using only their individual IDs encoded into a single ISWs. The central decodes the call request, extracts the requesting subscriber's individual ID, which is cross referenced to determine the subscriber's talk-group affiliation(s). If the requesting subscriber's affiliation(s) are not known, the central commands the subscriber to transmit its affiliation using dual ISW signalling. In another aspect of the present invention, each subscriber automatically informs the central of a change in talk-group affiliation, thereby providing continual affiliation updates. In this way, many thousand subscribers are afforded access to a single trunked system, and control channel traffic congestion is minimized.

13 Claims, 8 Drawing Figures

SUBSCRIBER  CENTRAL

—PRIOR ART—

SIGNALLING METHOD FOR ESTABLISHING TRUNKED COMMUNICATION

TECHNICAL FIELD

This invention relates generally to trunked communication systems, and more specifically to an improved signalling method for requesting or establishing trunked calls.

BACKGROUND ART

That trunked communication systems afford the most efficient use of limited frequency spectrum has become well accepted. In both the private and public markets, more and more businesses, associations, and agencies are specifying trunked systems for their communication needs. In a trunked communication system, a central controller allocates a limited number of channels among many subscribers. Generally, within a trunked system, the many subscribers are organized into fleets, sub-fleets or groups, and individuals. Accordingly, each subscriber has a fleet, group, and an individual identification (ID) code. Since the number of channels is far less than the number of subscribers, the subscribers must request and be granted a channel before they may communicate.

To initiate a group call, it is known for a requesting subscriber to transmit an information packet, commonly referred to as a "call request". The call request consists of an ID field containing the requesting subscriber's fleet, group, and individual IDs, and a digital code (referred to as a call type field), which represents the type of call desired (a group call in this example). Generally, call requests are encoded with error correcting and/or other codes to form Inbound Signalling Words (ISWs) to facilitate communication. The central controller receives the ISW and extracts the call request. If a channel is available, the central formats an information packet, commonly referred to as a "channel grant", which comprises the requesting subscriber's fleet, group, and individual IDs, and a channel assignment field, which contains a digital code representing the channel upon which communications may commence. The central encodes the channel grant into an Outbound Signalling Word (OSW), which is transmitted to all subscribers monitoring a selected one of the available channels designated as the control channel. If there is no channel available, the central formats and returns a "Busy OSW". Upon receipt of the channel grant, the requesting subscriber moves to the assigned channel and begins transmitting, while all other subscribers in the same group as the requesting subscriber move to the channel as listening units. In this way, a group call is established.

An advance in the trunked communication arts was afforded by an expanded signalling protocol described in a co-pending application by Ken Zdunek entitled "Improved Dispatch Trunked Radio System", Ser. No. 933,367, filed Nov. 19, 1986, and assigned to the same assignee as the present invention. The expanded signalling protocol employs dual ISWs to enable subscribers to request both inter-fleet and intra-fleet individual or private calls, as well as providing for advanced operational features such as Dynamic Individual Reprogramming, Dynamic Group Regrouping, Emergency Call, and other features desired or required by trunked system users. However, this advance was not without cost. In fact, it may be said that the advanced dual ISW signalling protocol contributes to control channel traffic congestion, which represents one of the potential problems of contemporary trunked communication systems. Within a single trunked system, there may be hundreds of fleets, several hundred groups, and several thousand subscribers. Given a fixed number of subscribers, the advanced dual ISW protocol automatically doubles the traffic on the control channel. Further, the congestion on the control channel may become compounded as additional subscribers are "loaded" (i.e., the central is programmed to recognize their IDs) onto the system. This may lead to unacceptable system access time in large high-use systems as subscribers are unable to place call requests on the congested control channel.

As previously mentioned, there has been, and presently continues to be, tremendous growth in both the installation of new trunked systems, and in the loading of additional subscribers onto existing systems. This continued growth, however, has identified another problem in contemporary trunked systems. That is, the problem of limited subscriber ID capacity. In present trunked systems, the ID portion of the call request is limited to sixteen (16) bits. These sixteen bits are allocated among the fleet, group, and individual IDs of a subscriber. Although it is possible, to a limited extent, to have fewer fleets and/or groups and to allocate more bits to the individual ID field, typically, present-day trunked systems may recognize only approximately ten (10) thousand different individual IDs. Although originally sufficient, today, many trunked system operators are turning away new subscribers or have lists of subscribers waiting to be loaded.

Therefore, there is a need in the art to provide a trunked communication system that allows many thousand subscribers to be recognized (loaded on the system), while contemporaneously providing a signalling scheme designed to reduce control channel congestion, while still providing the advanced features that are now expected and required by trunked system users.

SUMMARY OF THE INVENTION

Accordingly, it is an object of the present invention to provide an improved trunked communication system.

It is a further object of the present invention to provide a trunked communication system that allows several thousand additional subscribers to have access to the system.

It is another object of the present invention to provide a trunked communication system that does not increase control channel traffic congestion.

If is yet a further object of the present invention to provide a trunked communication system that reduces control channel traffic congestion, while contemporaneously providing advanced trunked system features.

It is yet another object of the present invention to provide a unique unifying communication protocol, which implements all the above objects.

If is a final object of the present invention to provide a unique unifying communication protocol which may be used in future trunked systems, and retrofitted into existing trunked systems.

It is the ultimate object of the present invention to provide an improved trunked communication system.

Briefly, according to the invention, a trunked communication signalling method is provided by a unifying signalling protocol in which subscribers request communication channels using only their individual IDs encoded into single ISWs. The central decodes the call request to extract the requesting subscriber's individual ID and cross references the same to determine the subscriber's talk-group affiliation. If the requesting subscriber's affiliation is not known, the central controller commands the subscriber to transmit its affiliation using dual ISW signalling prior to having access to the trunked system. In another aspect of the present invention, each subscriber informs the central of a change in talk-group affiliation, thereby providing continual affiliation updates. In this way, 65,536 subscribers are afforded access to a single trunked system, and control channel traffic congestion is minimized by employing single ISW signalling whenever possible.

BRIEF DESCRIPTION OF THE DRAWINGS

The features of the present invention which are believed to be novel are set forth with particularity in the appended claims. The invention, together with further objects and advantages thereof, may be understood by reference to the following description, taken in conjunction with the accompanying drawings, and the several figures of which like reference numerals identify like elements, and in which:

DETAILED DESCRIPTION OF THE PREFERRED EMBODIMENT

Figure 1:
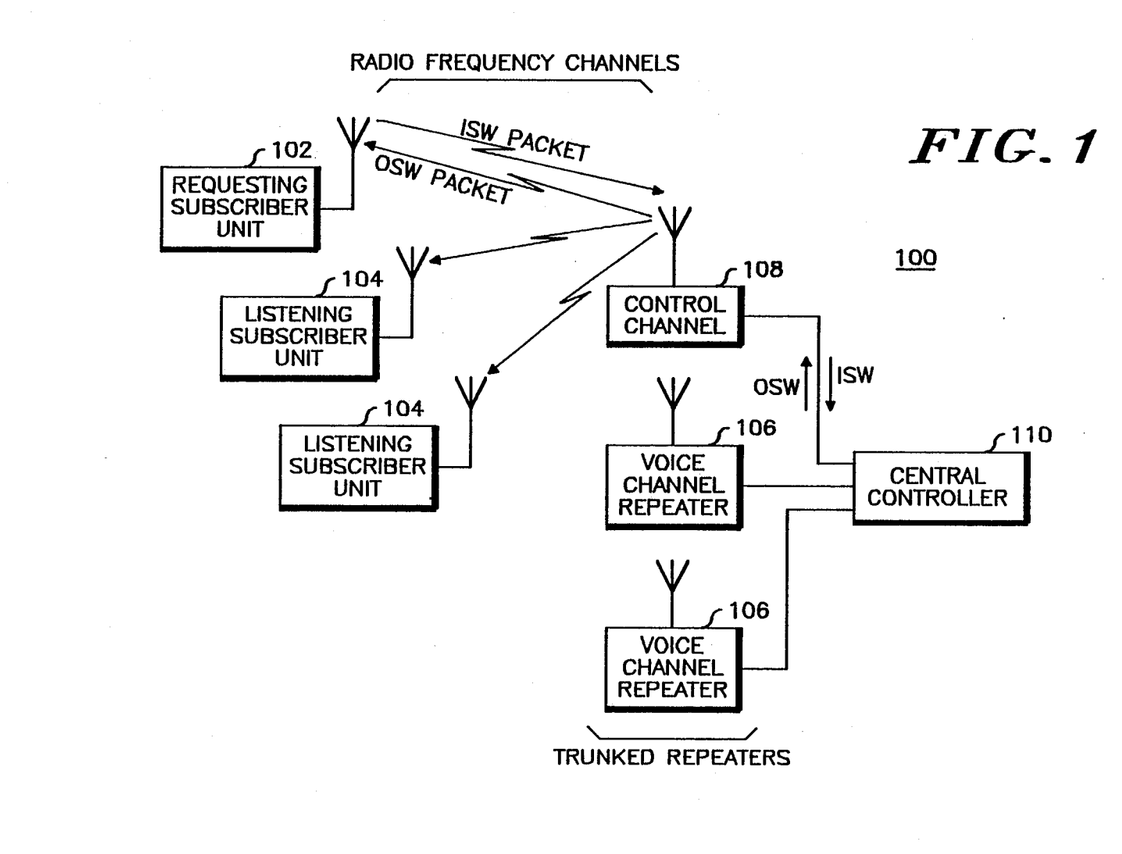
FIG. 1 is a block diagram of a typical trunked communication system which may employ the present invention.

Referring now to FIG. 1, there is shown a trunked communication system 100, which may use the unifying signalling protocol of the present invention. Typically, a trunked communication system comprises at least one central controller 110, a plurality trunked repeaters 106 (one of which is selected to operate as the control channel 108), and a plurality of subscriber units 102 and 104. The heart of the trunked system is the central controller 110. Call requests or other information encoded by the subscribers are relayed by the control channel repeater 108 to the central 110. The central allocates the limited channel resources 106 (two shown) among the several subscribers (three shown). The central controls the subscribers by encoding channel grants or other information into OSWs, which are received by all subscribers (102 and 104) monitoring the control channel 108.

Figure 2:
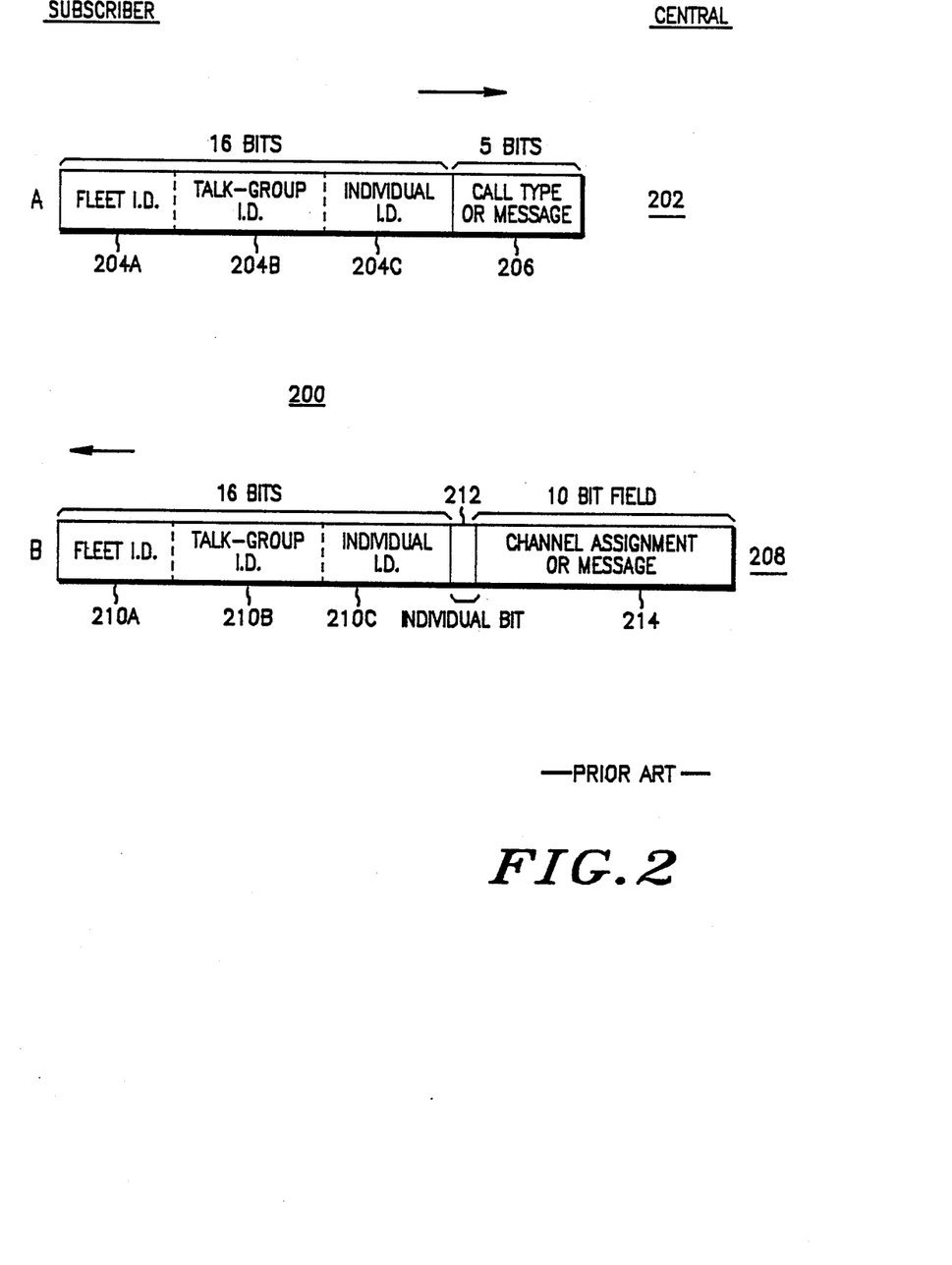
FIG. 2 is an illustration of the single word (ISW) signalling protocol of the prior art.

Referring now to FIG. 2, there is shown an illustration of the single word (ISW) signalling protocol 200 of the prior art. First, a subscriber forms and transmits a call request information packet 202 (communication A). The call request 202 consists of a 16 bit ID field 204a-c, which contains a binary number organized into and representing the subscriber's fleet ID 204a, group ID 204b, and individual ID 204c. The second field of the call request 202 is the call type (or alternately message code) field 206, which contains a binary number representing the type of call requested (i.e., individual call, group call, etc.). If a channel is available, the central forms and transmits a channel grant 208 (communication B). The channel grant 208 has a 16 bit ID field 210a-c, in which the subscriber ID of 204a-c is repeated. Additionally, a one (1) bit individual field 212, and a ten (10) bit channel assignment (or alternately message) field comprise the channel grant 208. Thus, the prior single ISW signalling protocol 200 provided a economical communication method (i.e., low traffic congestion), however, this protocol was unable to accommodate the advanced features or expanded information exchange required by contemporary trunked system users.

Figure 3:
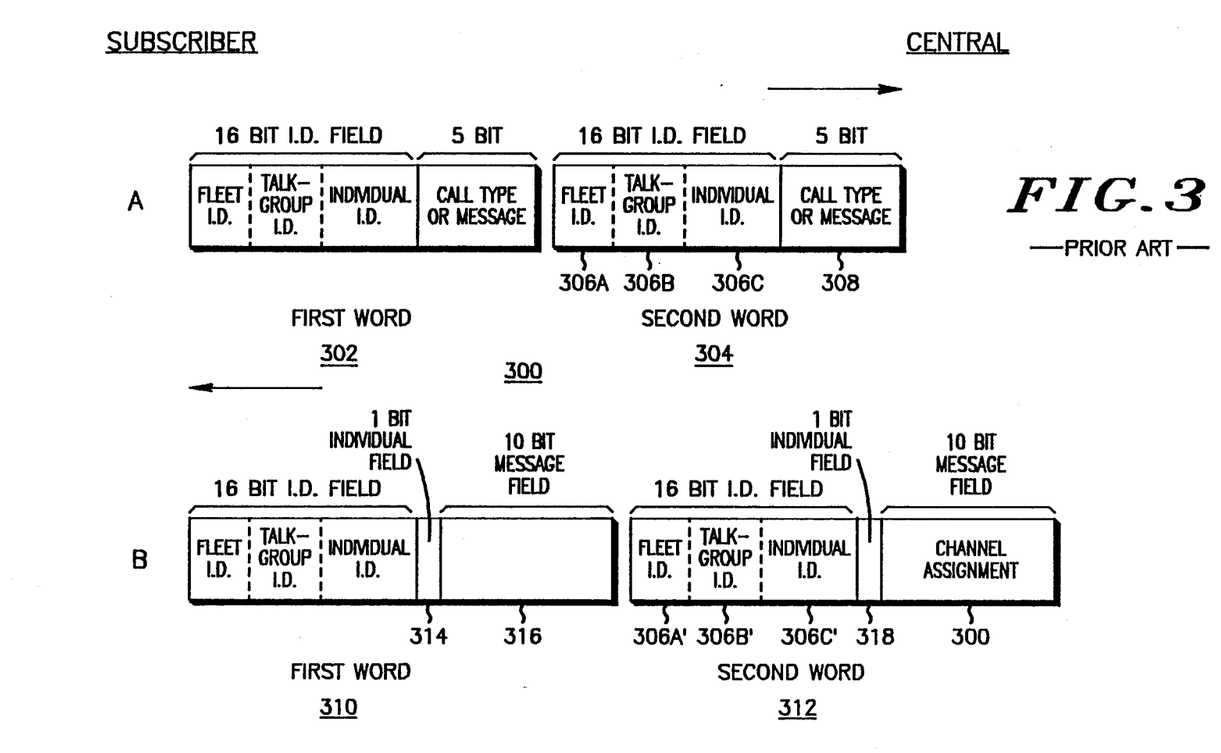
FIG. 3 is an illustration of the dual word (ISW) signalling protocol of the prior art.

Referring now to FIG. 3, the dual word (ISW) signalling protocol 300 of the prior art is illustrated. According to the protocol of dual word signalling, the subscriber transmits both a first word 302 and a second word 304 to the central (see communication A). The first word 302 comprises substantially the same information as the call request 202 of FIG. 2. The second word 304 comprises a 16 bit ID field 306a-c, which contains a binary number that may represent, for example, the fleet, group, and individual IDs of a particular subscriber (i.e., the called party of an individual-to-individual or private call). The second word 304 also contains a five (5) bit call type field 308, which may contain the same call type information as the first word 302. The channel grant also has dual words 310 and 312 (see communication B). The first word 310, comprises the same 16 bit fleet, group, and individual IDs as the first word 302 of the call request. Additionally, a one (1) bit individual field 314 and ten (10) bit message field 316 make up the first word 310. The second word 312 of the channel grant comprises a 16 bit field 306a'-c', which contains the same 16 bit fleet, group, and individual IDs as the second word 304 of the call request. Following this, the second word 312 comprises an individual field 318 and a 10 bit channel assignment 320, which is a binary number representing the particular trunked repeater (channel) upon which the subscribers are to communicate. As can be seen, the dual word signalling format 300 has the potential to convey significantly more information than the single ISW signalling format 200. However, equally apparent from FIGS. 2 and 3 is the added congestion (i.e., traffic) resultant from the expanded signalling protocol. Thus, a signalling protocol is needed to blend the benefits of both prior protocols, thereby unifying trunked system signalling.

Figure 4:
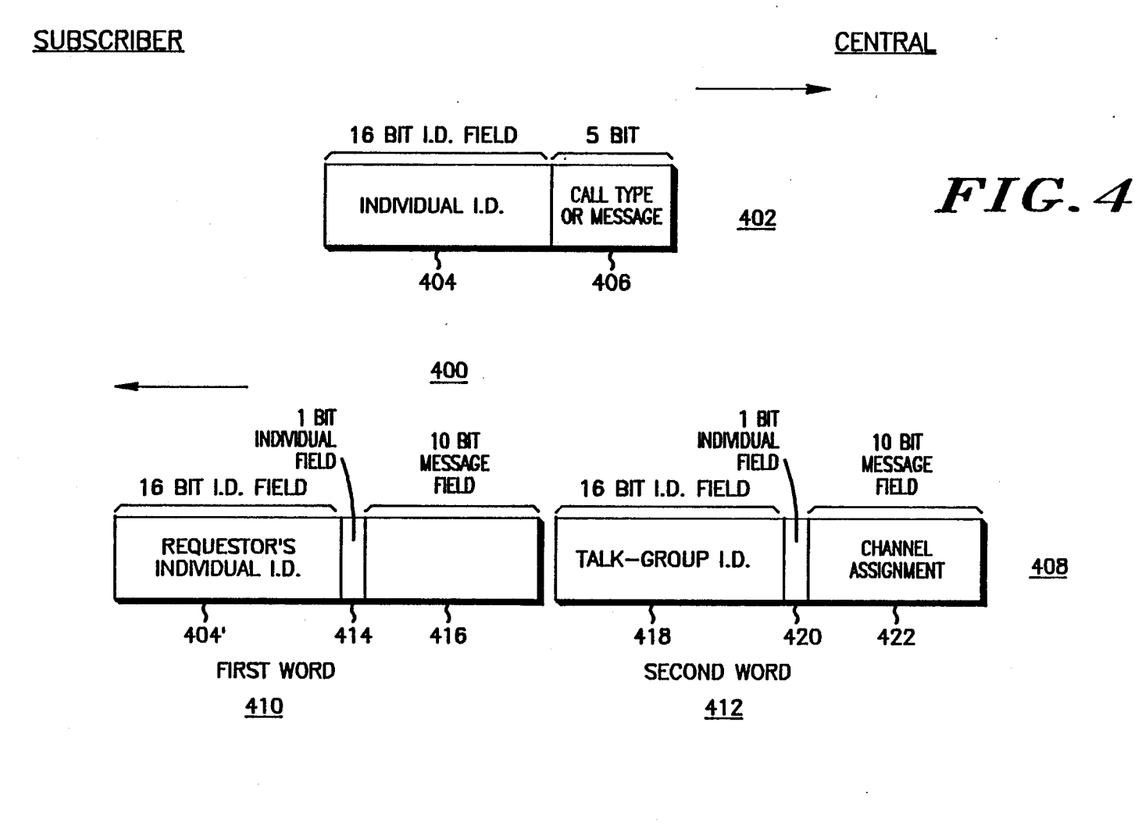
FIG. 4 is an illustration of the unifying signalling protocol used by the present invention.

Referring now to FIG. 4, the unifying signalling protocol of the present invention is illustrated. The present invention contemplates that the central has stored in any convenient storage means the "talk-group" affiliation of each subscriber authorized to use the system. That is, the subscribers of the present invention communicate within talk-groups, which may be either group-wide (analogous to group calls) or fleet-wide (analogous to fleet calls). The central "knows" (i.e., has been programmed by the system manager or operator) which talk-groups are affiliated with which fleets. Thus, a requesting subscriber need only transmit its individual ID since the central may itself determine the subscriber's fleet-wide talk-group and group-wide talk-group IDs by cross-reference. Thus, in the unifying protocol of the present invention, only individual calls and talk-group calls may be made, however, the talk-group calls may be group-wide or fleet-wide in type. Therefore, since the subscriber need only transmit its individual ID, the entire 16 bit ID field may be allocated to represent the individual ID of a requesting subscriber. Therefore, the present invention permits:

$$2^{16} = 65,536 \qquad (1)$$

subscribers to operate on one trunked system. Accordingly, the call request 402 of the present invention comprises only the 16 bit binary number representing the individual ID (404) of the requesting subscriber, and a call type code 406, which represents either a talk-group or individual call request.

Upon receiving and decoding the call request 402, the central determines whether the individual ID of the requestor is authorized to use (i.e., registered on) the trunked system. If so, the central determines the talk-group affiliation(s) of the subscriber by cross-referencing the subscriber's individual ID to its group-wide talk-group ID, which is conveniently stored in any suitable storage means. If the central determines that the call request comprises a group-wide call, the central may format and return an appropriate group-wide talk-group channel grant. If, however, the call request is for a fleet-wide call, the central determines the subscriber's fleet-wide talk-group ID. Accordingly, a fleet-wide or group-wide talk-group channel grant 408 is of the dual word type and comprises a first word 410 and a second word 412. The first word 410 consists of the requesting subscriber's individual ID 404', a one bit individual field 414, and a ten bit status field 416. The second word 412 consists of a first field having 16 bits, which contains a binary number representing either the fleet-wide or group-wide talk-group ID with which the requestor will communicate. The second word also has a one bit individual field 420 and a ten bit channel assignment field 422, which indicates the channel upon which communication may commence.

Thus, the present invention provides a unifying protocol employing both single word and dual word signalling. Single word signalling is used for talk-group call requests, while channel grants are returned using a dual word format. This arrangement eases control channel traffic since subscriber requests are transmitted randomly. That is, a subscriber has no knowledge beforehand whether another subscriber will simultaneously transmit a call request, which results in a call request collision. Therefore, using single word signalling (as opposed to dual word signalling) on the inbound asynchronous channel eases congestion by reducing call request collisions. On the outbound control channel, dual word signalling affords the present invention the ability to convey superior amounts of information to support the advanced features of contemporary trunked systems. The dual word channel grant protocol does not unduly burden the outbound channel because it is synchronous. That is, the central has the ability to queue outbound OSWs and transmit them in a contiguous seriatim manner. Accordingly, the present invention provides for reduced control channel congestion, while supporting advanced trunking features. Moreover, the present invention additionally allows a substantially increased number of subscribers to avail themselves to the advantages of trunked communication.

Figure 5:
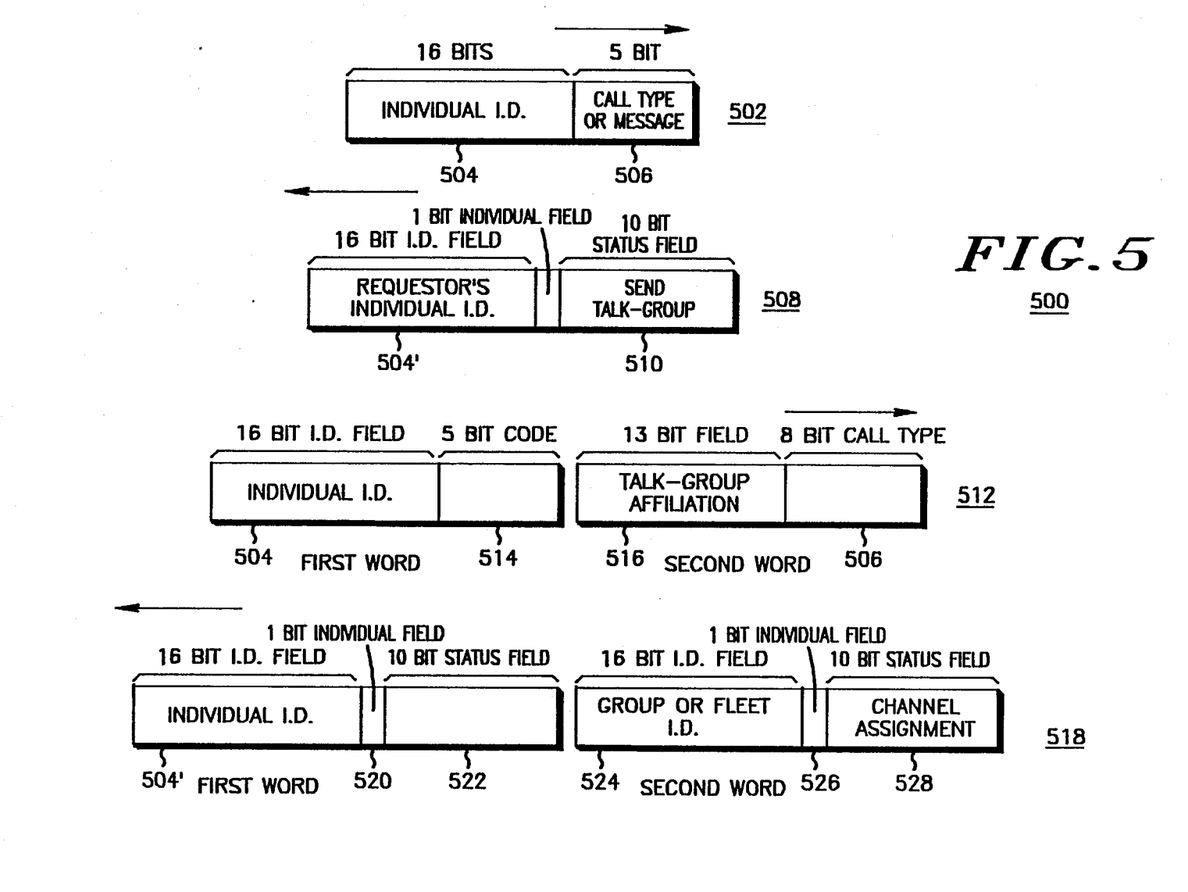
FIG. 5 is an illustration of the unifying signalling protocol used by the present invention to update a subscriber's affiliation at the command of the central controller.

Referring now to FIG. 5, the preferred signalling protocol 500 of the present invention to update the subscriber's talk-group affiliation is illustrated. The present invention contemplates several circumstances under which the central would not have the subscriber's talk-group affiliation, or at least, not the correct affiliation. For example, a newly loaded subscriber will have no talk-group affiliation stored within the central. Further, the memory means within the central may fail and all subscriber affiliations may be lost. Moreover, in the case of an established subscriber, the current talk-group affiliation may be readily changed by the subscriber. That is, a subscriber may have the ability to change, at will, from talk-group to talk-group. In this case, the central will have not have the subscriber's current talk-group affiliation, and thus, would be unable to properly structure a call.

Referring still to FIG. 5, a subscriber may transmit a call request 502, which comprises its 16 bit individual ID 504, and a call type code 506. The central decodes the ISW to recover the subscriber's individual ID and determines whether the subscriber is authorized to use the trunked system. If so, the central may cross reference the subscriber's individual ID to determine the subscriber's talk-group affiliation(s). If, due to failure or otherwise, the central determines that there is no talk-group affiliation stored for that particular subscriber, the central formats a single word command 508, which comprises a first field containing the requestor's individual ID 504', an individual bit, and a 10 bit "send talk-group affiliation" command code 510. The requesting subscriber alone decodes the command 508 and responds by transmitting an affiliation update message 512. The update message 512 is preferably of the dual word type with the first word consisting of the requesting subscriber's 16 bit individual ID 504 and a 5 bit field containing a 5 bit digital code 514, which indicates that a second word containing the subscriber's group-wide talk-group affiliation follows. The second word of the update message 512 is also divided into two fields, the first of which contains a 13 bit binary number representing the subscriber's group-wide talk-group affiliation 516, and the second field 506 repeats comprises an 8 bit digital word representing status and/or call type information. The central receives and decodes the update message 512 and conveniently stores the subscriber's talk-group affiliation 516. The central may now format and transmit a dual word channel grant 518. As discussed in conjunction with FIG. 4, the preferred channel grant has as a first word the subscriber's 16 bit individual ID 504', a one bit individual field 520, and a 10 bit status field 522. The second word comprises a first field 524 containing a binary number representing either a fleet-wide or group-wide talk-group ID (depending on the call type request), a one bit individual field 526, and a ten bit channel assignment field 528. In this way, the central may be updated prior to granting the requestor access to the trunked system.

In the case of an established subscriber that changes talk-groups, the present invention contemplates that the subscriber will automatically update the central. Typically, each subscriber having the ability to change talk-groups is equipped with a selection mechanism, such as a push-button or rotary switch. In one preferred embodiment, each subscriber may automatically format and transmit an update message (512 of FIG. 5) whenever the subscriber changes talk-groups. That is, as soon as the subscriber actuates the selection mechanism, the subscriber transmits the update message and awaits an acknowledge OSW from the central. Preferably, the acknowledge OSW comprises a single word command (such as command 508 of FIG. 5) to minimize control channel traffic, however, a dual word command (such as command 518 of FIG. 5) may be used. This method is generally preferable for push-button or keyboard type selection mechanisms.

In another preferred embodiment, an affiliation update message (512 of FIG. 5) is automatically transmitted upon the subscriber's next actuation of the push-to-talk (PTT) switch following a talk-group affiliation change. In this way, a subscriber may make several talk-group changes without generating additional update messages until the subscriber desires to communicate. In either of these preferred embodiments, the subscriber makes call requests using the dual word format until it receives either a channel grant or an acknowledge message.

Figure 6A:
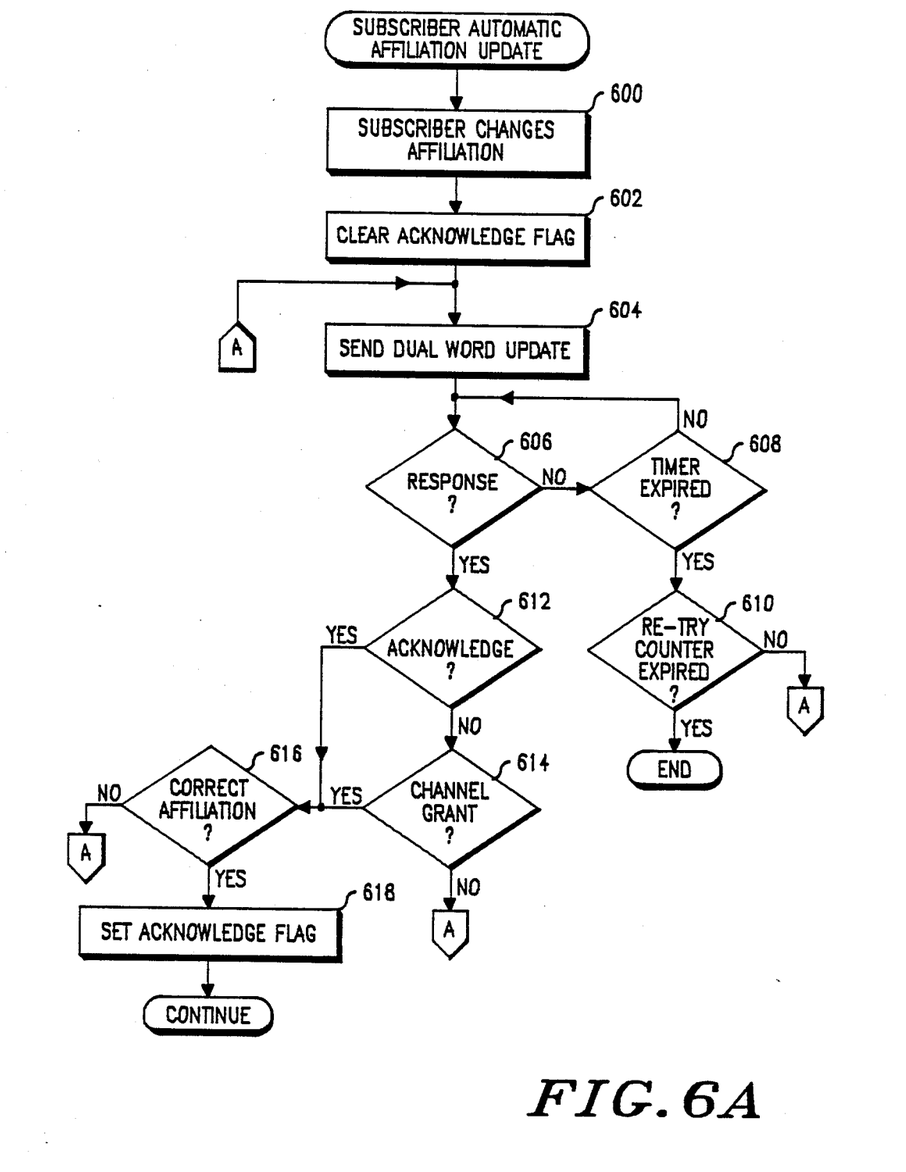
FIGS. 6a-b are flow charts of the steps executed by a subscriber unit in accordance with the unifying signalling protocol of the present invention.
Figure 6B:
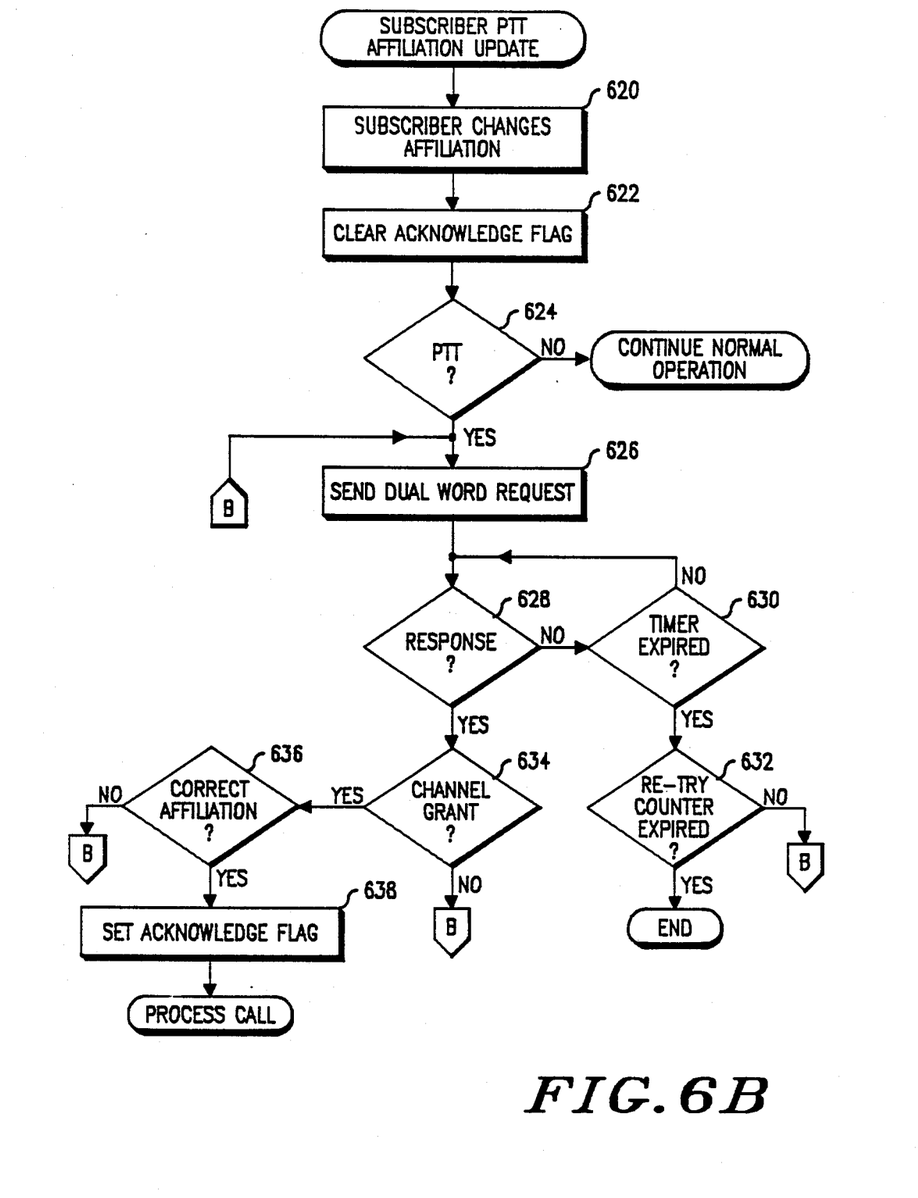

Referring now to FIGS. 6a-b, flow diagrams illustrating the steps executed by a subscriber operating according to the present invention are shown. In FIG. 6a, the automatic affiliation routine begins in step 600, wherein a subscriber changes its talk-group affiliation. In step 602, an acknowledge (ACK) flag is cleared. The purpose of the acknowledge flag is to have a record within the subscriber indicating that the central possesses the current talk-group affiliation of the subscriber. According to the present invention, if the ACK flag is set (i.e., logic one) the subscriber assumes that the central possesses its current talk-group affiliation and would operate to transmit a single word channel request for any future communications. Conversely, if the ACK flag is not set (i.e., logic zero) the subscriber would transmit a dual word channel request for a communication channel since the subscriber would assume that the central does not possesses its current talk-group affiliation.

In an automatically updating subscriber, a dual word update (see 512 of FIG. 5) is transmitted (step 604) immediately after a subscriber changes its talk-group affiliation. Accordingly, decision 606 determines whether the updating subscriber has received a response from the central acknowledging the central's reception of the update message. If no response has been received, decision 608 determines whether the response timer has expired. If not, a loop is formed between decision 606 and 608 until either a response is received or the timer expires. If the timer has elapsed, decision 610 determines whether a retry counter has expired. Preferably, each subscriber will re-transmit (retry) the dual word update a predetermined number of times. If the counter has expired, the routine ends and the subscriber must re-start the routine later. If the retry counter has not expired, the routine returns to step 604 (reference letter A) re-transmit the dual word update.

Assuming that a response is received, decision 612 determines whether an acknowledge OSW has been received. If the response received was not an acknowledge OSW, decision 614 determines whether a channel grant (see 518 of FIG. 5) has been received. If not, the response received was invalid and the routine returns to reference letter A. If the determination of either decision 612 or 614 was affirmative, the routine proceeds to decision 616, which determines whether the subscriber was returned the correct affiliation. If so, step 618 sets the subscriber's ACK flag and the routine continues normal operation. If, however, the determination of decision 616 is that the central has returned an incorrect affiliation, the routine reverts to step 604 (reference letter A), which re-transmits the dual word update in an attempt to correct the central.

In FIG. 6b, the PTT affiliation update routine for a subscriber unit is shown. In step 620, the subscriber units changes (perhaps several times) its talk-group affiliation. When a talk-group affiliation is changed, the ACK flag is cleared in step 622. Decision 624 determines whether the subscriber has activated its PTT switch to initiate a call. If not, the subscriber continues normal operation. However, if the PTT of the subscriber has been activated, step 626 transmits a dual word call request since the subscribers talk-group has changed. Accordingly, decision 628 determines whether the central has responded to the subscriber's call request. If not, decision 630 determines whether the time-out timer has expired. As previously described in conjunction with FIG. 6a, decisions 628 and 630 form a waiting loop until a response is received or the timer expires. If the timer has elapsed, decision 632 determines whether the re-try counter has expired. If not, the subscriber will re-transmit (step 626) the request. If however, decision 632 determines that the retry timer has expired, the routine ends.

If a response is recognized, decision 634 determines whether the received response was a channel grant (see 518 of FIG. 5). If not, the response was invalid and the routine returns to reference letter B to re-transmit the call request (step 626). If, however, the determination of decision 634 is that a channel grant was received, decision 636 determines whether the correct affiliation (see 524 of FIG. 5) was returned with the channel grant. If not, the routine reverts to reference letter B to re-send a dual word update (step 626) to correct the central. If, however, the central has the correct affiliation the ACK flag is set (i.e., logic one) in step 638 and the subscriber processes the call normally. In this way, the subscriber units of the present invention operate to transmit single word call requests whenever possible, reverting to dual word signalling only upon command or when changing talk-group affiliations.

Figure 7:
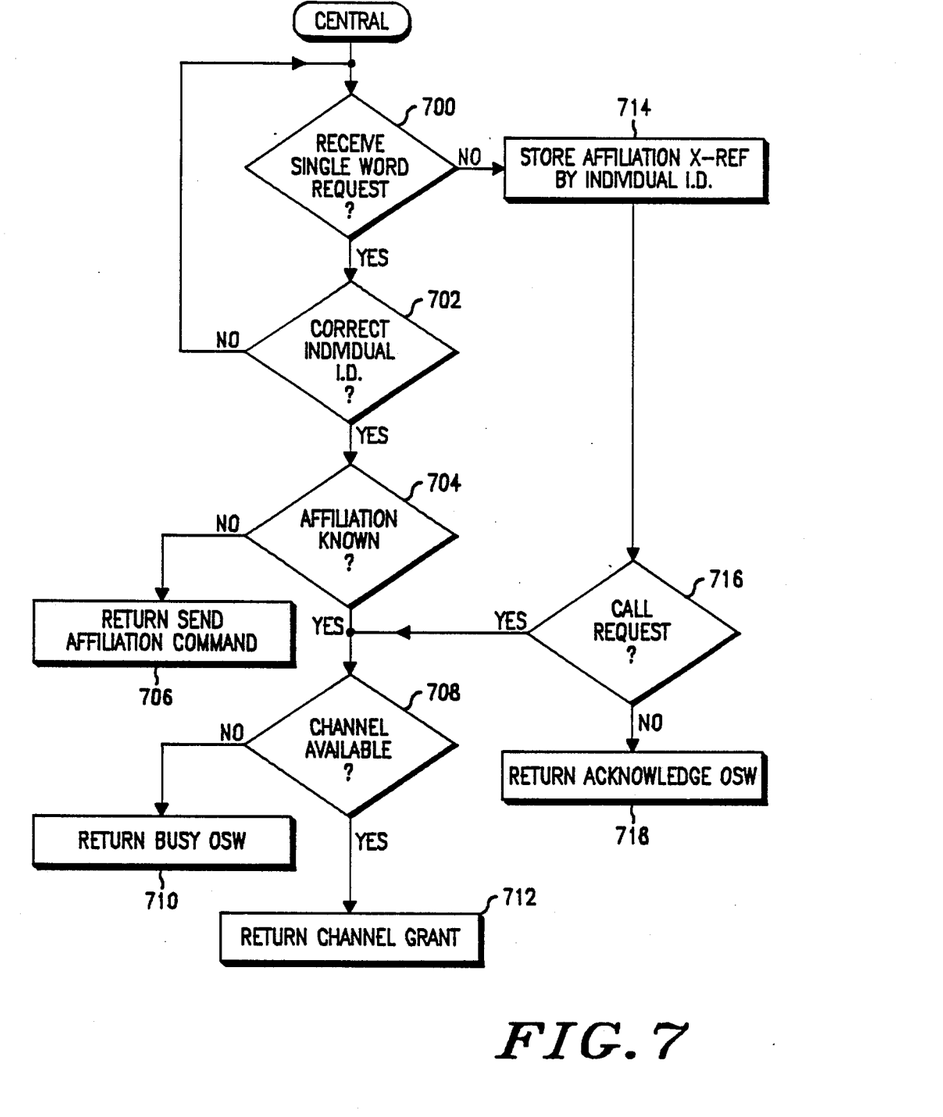
FIG. 7 is a flow chart of the steps executed by the central controller in accordance with the unifying signalling protocol of the present invention.

Referring now to FIG. 7, the steps executed by the central controller in accordance with the present invention is shown. The routine begins in step 700 in which the central determines whether a single word call request has been received. If the determination of decision 700 is that a single word request (502) has been received, decision 702 determines whether the request had the correct individual ID. That is, whether the individual ID transmitted in the call request is one authorized to use the trunked system. If not, the request is ignored and the routine returns to decision 700 to begin again. However, if decision 702 determines that the subscriber is authorized, the routine proceeds to step 704, which cross-references the individual ID to determine the subscriber's affiliation(s). If the affiliation(s) are not known to the central, step 706 returns a send affiliation command (508) to the particular subscriber If the affiliation(s) are known, the routine proceeds to decision 708, which determines whether a channel is available on the trunked system. If not, step 710 returns a Busy OSW to the subscriber indicating that all channels are currently in use. However, if the determination of step 708 is that a channel is available step 712 formats and returns a channel grant (518) to the requesting subscriber.

Assuming that the determination of decision 700 is that a single word request (502) was not received, a dual word update and/or request (508) must have been received. Accordingly, the routine proceeds to step 714 in which the individual ID (504) and the updated affiliation (516) are extracted, cross-referenced and stored in any convenient storage means. Decision 716 determines whether or not the update was also a call request (506). If not, step 718 returns an acknowledgment OSW to indicate to the subscriber that the central now has the correct affiliation. If the determination of decision 716 is that a call request was contained with the update, the routine proceeds to decision 708 and the call request is processed as previously described.

While particular embodiments of the present invention have been described and shown, it should be understood to those of ordinary skill in the art that the present invention is not limited thereto since many modifications may be made. It is therefore contemplated to cover by the present application any and all such modifications that fall within the true spirit and scope of the basic underlying principles disclosed and claimed herein.

What is claimed is:

1. In a trunked communication system having at least one central controller for allocating a limited number of communication channels among a plurality of subscriber units organized in groups and each subscriber having at least an individual identification code and a talk-group affiliation, said subscribers constructed and arranged to communicate information on any of the communication channels, a method for any of the plurality of subscribers to request access to a communication channel comprising the steps of:
   (a) transmitting a message comprising at least a call request information word having a predetermined bit length and being organized in fields, wherein a first field represents the subscriber's individual identification code, and a second field represents the type of call requested;
   (b) receiving a message comprising at least channel grant information words each having a predetermined bit length and being organized in fields, wherein:
      (i) a first word comprises a first field representing said subscriber's individual identification code, and a second field representing a predetermined digital word;
      (ii) a second word comprises a first field representing said subscriber's talk-group affiliation, and a second field representing a channel assignment.

2. In a trunked communication system having at least one central controller for allocating a limited number of communication channels among a plurality of subscriber units organized in groups and each subscriber having at least an individual identification code and a talk-group affiliation, said subscribers constructed and arranged to communicate information on any of the communication channels, a method for any of the plurality of subscribers to request access to a communication channel comprising the steps of:
   (a) transmitting a message comprising at least a call request information word having a predetermined bit length and being organized in fields, wherein a first field represents the subscriber's individual identification code, and a second field represents the type of call requested;
   (b) receiving a message comprising at least a command information word having a predetermined bit length and being organized in fields, wherein a first field represents said subscriber's individual identification code, and a second field represents a predetermined command code;
   (c) transmitting a message comprising at least call request information words each having a predetermined bit length and being organized in fields, wherein:
      (i) a first word comprises a first field representing said subscriber's individual identification code, and a second field representing a predetermined digital word;
      (ii) a second word comprises a first field representing said subscriber's talk-group affiliation, and a second field representing said type of call requested;
   (d) receiving a message comprising at least channel grant information words each having a predetermined bit length and being organized in fields, wherein:
      (i) a first word comprises a first field representing said subscriber's individual identification code, and a second field representing a predetermined digital word;
      (ii) a second word comprises a first field representing said subscriber's talk-group affiliation, and a second field representing a channel assignment.

3. In a trunked communication system having at least one central controller for allocating a limited number of communication channels among a plurality of subscriber units organized in groups and each subscriber having at least an individual identification code and a talk-group affiliation, said subscribers constructed and arranged to communicate information on any of the communication channels, a subscriber unit, comprising:
   means for transmitting a message comprising at least a call request information word having a predetermined bit length and being organized in fields, wherein a first field represents the subscriber's individual identification code, and a second field represents the type of call requested;
   means for receiving a message comprising at least channel grant information words each having a predetermined bit length and being organized in fields, wherein:
      (i) a first word comprises a first field representing said subscriber's individual identification code, and a second field representing a predetermined digital word;
      (ii) a second word comprises a first field representing said subscriber's talk-group affiliation, and a second field representing a channel assignment.

4. In a trunked communication system having at least one central controller for allocating a limited number of communication channels among a plurality of subscriber units organized in groups and each subscriber having at least an individual identification code and a talk-group affiliation, said subscribers constructed and arranged to communicate information on any of the communication channels, a subscriber unit comprising:
   means for transmitting a message comprising at least a call request information word having a predetermined bit length and being organized in fields, wherein a first field represents the subscriber's individual identification code, and a second field represents the type of call requested;

means for receiving a message comprising at least a command information word having a predetermined bit length and being organized into fields, wherein a first field represents said subscriber's individual identification code, and a second field represents a predetermined command code;

means for transmitting a message comprising at least call request information words each having a predetermined bit length and being organized into fields, wherein:
  (i) a first word comprises a first field representing said subscriber's individual identification code, and a second field representing a predetermined digital word;
  (ii) a second word comprises a first field representing said subscriber's talk-group affiliation, and a second field representing said type of call requested;

means for receiving a message comprising at least channel grant information words each having a predetermined bit length and being organized in fields, wherein:
  (i) a first word comprises a first field representing said subscriber's individual identification code, and a second field representing a predetermined digital word;
  (ii) a second word comprises a first field representing said subscriber's talk-group affiliation, and a second field representing a channel assignment.

5. In a trunked communication system having at least one central controller for allocating a limited number of communication channels among a plurality of subscriber units organized in groups and each subscriber having at least an individual identification code and a talk-group affiliation, said subscribers constructed and arranged to communicate information on any of the communication channels, a method for any of the plurality of subscribers to request access to a communication channel comprising the steps of:

at any of the subscriber units:
  (a) transmitting a message comprising at least a call request information word having a predetermined bit length and being organized in fields, wherein a first field represents the subscriber's individual identification code, and a second field represents the type of call requested;
  (b) receiving a message comprising at least channel grant information words each having a predetermined bit length and being organized in fields, wherein:
    (i) a first word comprises a first field representing said subscriber's individual identification code, and a second field representing a predetermined digital word;
    (ii) a second word comprises a first field representing said subscriber's talk-group affiliation, and a second field representing a channel assignment;

at the central controller:
  (a) receiving said message comprising at least a call request information word having a predetermined bit length and being organized in fields, wherein a first field represents the subscriber's individual identification code, and a second field represents the type of call requested;
  (b) cross-referencing said subscriber's individual identification code to provide the subscriber's talk-group affiliation;
  (c) transmitting said message comprising at least channel grant information words each having a predetermined bit length and being organized into fields, wherein:
    (i) a first word comprises a first field representing said subscriber's individual identification code, and a second field representing a predetermined digital word;
    (ii) a second word comprises a first field representing said subscriber's talk-group affiliation, and a second field representing a channel assignment.

6. The method of claim 5, which includes the central controller step of: (a1) determining whether said subscriber's individual identification code is valid.

7. The method of claim 5, which includes the central controller step of transmitting a message comprising at least a command information word having a predetermined bit length and being organized in fields, wherein a first field represents said subscriber's individual identification code, and a second field represents a predetermined command code, if the central is unable to determine said subscriber's talk-group affiliation.

8. In a trunked communication system having at least one central controller for allocating a limited number of communication channels among a plurality of subscriber units organized in groups and each subscriber having at least an individual identification code and a talk-group affiliation, said subscribers constructed and arranged to communicate information on any of the communication channels, a method for any of the plurality of subscribers to request access to a communication channel comprising the steps of:

at any of the subscriber units:
  (a) transmitting a message comprising at least a call request information word having a predetermined bit length and being organized in fields, wherein a first field represents the subscriber's individual identification code, and a second field represents the type of call requested;
  (b) receiving a message comprising at least a command information word having a predetermined bit length and being organized in fields, wherein a first field represents said subscriber's individual identification code, and a second field represents a predetermined command code;
  (c) transmitting a message comprising at least call request information words each having a predetermined bit length and being organized in fields, wherein:
    (i) a first word comprises a first field representing said subscriber's individual identification code, and a second field representing a predetermined digital word;
    (ii) a second word comprises a first field representing said subscriber's talk-group affiliation, and a second field representing said type of call requested;
  (d) receiving a message comprising at least channel grant information words each having a predetermined bit length and being organized in fields, wherein:
    (i) a first word comprises a first field representing said subscriber's individual identification code, and a second field representing a predetermined digital word;
    (ii) a second word comprises a first field representing said subscriber's talk-group affiliation, and a second field representing a channel assignment;

at the central controller:
(a) receiving said message comprising at least a call request information word having a predetermined bit length and being organized in fields, wherein a first field represents the subscriber's individual identification code, and a second field represents the type of call requested;
(b) cross-referencing said subscriber's individual identification code thereby determining the absence of the subscriber's talk-group affiliation;
(c) transmitting said message comprising at least a command information word having a predetermined bit length and being organized in fields, wherein a first field represents said subscriber's individual identification code, and a second field represents a predetermined command code;
(d) receiving said message comprising at least call request information words each having a predetermined bit length and being organized in fields, wherein:
 (i) a first word comprises a first field representing said subscriber's individual identification code, and a second field representing a predetermined digital word;
 (ii) a second word comprises a first field representing said subscriber's talk-group identification code, and a second field representing said type of call requested;
(e) transmitting said message comprising at least channel grant information words each having a predetermined bit length and being organized in fields, wherein:
 (i) a first word comprises a first field representing said subscriber's individual identification code, and a second field representing a predetermined digital word;
 (ii) a second word comprises a first field representing said subscriber's talk-group affiliation, and a second field representing a channel assignment.

9. The method of claim 8, which includes the central controller step of: (a1) determining whether said subscriber's individual identification code is valid.

10. In a trunked communication system having at least one central controller for allocating a limited number of communication channels among a plurality of subscriber units organized in groups and each subscriber having at least an individual identification code and a talk-group affiliation, said subscribers constructed and arranged to change at least their talk-group affiliation at will and to communicate information on any of the communication channels, a method for any of the plurality of subscribers to update the central of a talk-group affiliation change comprising the steps of:
(a) transmitting, automatically, following selection of another talk-group affiliation, a message comprising at least update information words each having a predetermined bit length and being organized in fields, wherein:
 (i) a first word comprises a first field representing said subscriber's individual identification code, and a second field representing a predetermined digital word;
 (ii) a second word comprises a first field representing said subscriber's talk-group affiliation, and a second field representing a predetermined code word;
(b) receiving a message comprising at least an acknowledge information word having a predetermined acknowledge code.

11. In a trunked communication system having at least one central controller for allocating a limited number of communication channels among a plurality of subscriber units organized in groups and each subscriber having at least an individual identification code and a talk-group affiliation, said subscribers constructed and arranged to change at least their talk-group affiliation at will and to communicate information on any of the communication channels, a subscribers unit comprising:
means for transmitting, automatically, following selection of another talk-group affiliation, a message comprising at least update information words each having a predetermined bit length and being organized in fields, wherein:
 (i) a first word comprises a first field representing said subscriber's individual identification code, and a second field representing a predetermined digital word;
 (ii) a second word comprises a first field representing said subscriber's talk-group affiliation, and a second field representing a predetermined code word;
means for receiving a message comprising at least an acknowledge information word having a predetermined acknowledge code.

12. In a trunked communication system having at least one central controller for allocating a limited number of communication channels among a plurality of subscriber units organized in groups and each subscriber having at least an individual identification code and a talk-group affiliation, said subscribers constructed and arranged to change at least their talk-group affiliation at will and to communicate information on any of the communication channels, a method for any of the plurality of subscribers to update the central of a talk-group affiliation change comprising the steps of:
(a) transmitting, automatically, with the subscriber's next transmission, a message comprising at least update/call request information words each having a predetermined bit length and being organized in fields, wherein:
 (i) a first word comprises a first field representing said subscriber's individual identification code, and a second field representing a predetermined digital word;
 (ii) a second word comprises a first field representing said subscriber's talk-group affiliation, and a second field representing the type of call requested;
(b) receiving a message comprising at least channel grant information words each having a predetermined bit length and being organized in fields, wherein:
 (i) a first word comprises a first field representing said subscriber's individual identification code, and a second field representing a predetermined digital word;
 (ii) a second word comprises a first field representing said subscriber's talk-group affiliation, and a second field representing a channel assignment.

13. In a trunked communication system having at least one central controller for allocating a limited number of communication channels among a plurality of subscriber units organized in groups and each subscriber having at least an individual identification code and a talk-group affiliation, said subscribers constructed and arranged to change at least their talk-group affiliation at will and to communicate information on any of the communication channels, a subscriber unit comprising:

means for transmitting, automatically, with the subscriber's next transmission, a message comprising at least update/call request information words each having a predetermined bit length and being organized in fields, wherein:
      (i) a first word comprises a first field representing said subscriber's individual identification code, and a second field representing a predetermined digital word;
      (ii) a second word comprises a first field representing said subscriber's talk-group affiliation, and a second field representing the type of call requested;

means for receiving a message comprising at least channel grant information words each having a predetermined bit length and being organized in fields, wherein:
      (i) a first word comprises a first field representing said subscriber's individual identification code, and a second field representing a predetermined digital word;
      (ii) a second word comprises a first field representing said subscriber's talk-group affiliation, and a second field representing a channel assignment.

* * * * *